(12) United States Patent
Zhang et al.

(10) Patent No.: US 8,687,714 B2
(45) Date of Patent: Apr. 1, 2014

(54) METHOD, APPARATUS, AND SYSTEM FOR CODING AND MODULATING DATA

(71) Applicant: Huawei Technologies Co., Ltd., Shenzhen (CN)

(72) Inventors: Shunqing Zhang, Shanghai (CN); Shugong Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/860,760

(22) Filed: Apr. 11, 2013

(65) Prior Publication Data
US 2013/0223545 A1 Aug. 29, 2013

Related U.S. Application Data

(63) Continuation of application No. PCT/CN2012/071908, filed on Mar. 5, 2012.

(30) Foreign Application Priority Data
Mar. 22, 2011 (CN) .......................... 2011 1 0069312

(51) Int. Cl.
*H04L 27/00* (2006.01)

(52) U.S. Cl.
USPC ........................................................ 375/259

(58) Field of Classification Search
USPC .......... 375/259, 267, 346, 358; 370/208, 320, 370/333; 455/69, 423, 424, 522
See application file for complete search history.

(56) References Cited

U.S. PATENT DOCUMENTS

| 2003/0064744 A1* | 4/2003 | Zhang et al. | 455/522 |
|---|---|---|---|
| 2004/0132496 A1 | 7/2004 | Kim et al. | |
| 2005/0157639 A1* | 7/2005 | Song et al. | 370/208 |

(Continued)

FOREIGN PATENT DOCUMENTS

| CN | 1652493 A | 8/2005 |
|---|---|---|
| CN | 101127541 A | 2/2008 |

(Continued)

OTHER PUBLICATIONS

Foreign Communication From a Counterpart Application, PCT Application PCT/CN2012/071908, International Search Report dated Jun. 14, 2012, 6 pages.

(Continued)

*Primary Examiner* — Khai Tran
(74) *Attorney, Agent, or Firm* — Conley Rose, P.C.; Grant Rodolph; Nicholas K. Beaulieu (57) ABSTRACT

A method, an apparatus, and a system for coding and modulating data are disclosed. The method includes: obtaining, from a receiver and a transmitter, parameters for calculating power consumption of the transmitter; calculating, according to the parameters, the power consumption of the transmitter under various combinations of modulation orders and coding rates supported by the transmitter; and selecting a bitwidth, modulation order, and coding rate corresponding to minimum power consumption of the transmitter to code and modulate data sent to the receiver. The method, apparatus, and system provided in embodiments of the present application save power consumption of the transmitter, and greatly improve energy utilization of a wireless device having a digital processing unit.

20 Claims, 4 Drawing Sheets

(56) References Cited

U.S. PATENT DOCUMENTS

| | | |
|---|---|---|
| 2006/0245524 A1 | 11/2006 | Niederholz et al. |
| 2008/0009322 A1 | 1/2008 | Kim |
| 2008/0080542 A1 | 4/2008 | Vishwanathan et al. |
| 2009/0161742 A1 | 6/2009 | Ivory et al. |
| 2010/0150165 A1 | 6/2010 | Chang et al. |
| 2010/0180176 A1 | 7/2010 | Yosoku et al. |

FOREIGN PATENT DOCUMENTS

| | | |
|---|---|---|
| CN | 101640928 A | 2/2010 |
| CN | 101860501 A | 10/2010 |
| DE | 102005019176 A1 | 11/2006 |
| EP | 1876854 A1 | 9/2008 |
| WO | 0147294 A2 | 6/2001 |
| WO | 2004025870 A1 | 3/2004 |

OTHER PUBLICATIONS

Foreign Communication From a Counterpart Application, PCT Application PCT/CN2012/071908, English Translation of International Search Report dated Jun. 14, 2012, 2 pages.

Foreign Communication From a Counterpart Application, PCT Application PCT/CN2012/071908, Written Opinion dated Jun. 14, 2012, 3 pages.

Park, et al., "Dynamic Bit-Width Adaptation in DCT: An Approach to Trade Off Image Quality and Computation Energy," IEEE Transactions on Very Large Scale Integration (VLSI) Systems, vol. 18, No. 5, May 2010, pp. 787-793.

Foreign Communication From a Counterpart Application, European Application No. 12761114.3, Extended European Search Report dated Jul. 4, 2013, 8 pages.

* cited by examiner

METHOD, APPARATUS, AND SYSTEM FOR CODING AND MODULATING DATA

CROSS-REFERENCE TO RELATED APPLICATIONS

This application is a continuation of International Application No. PCT/CN2012/071908, filed on Mar. 5, 2012, which claims priority to Chinese Patent Application No. 201110069312.4, filed on Mar. 22, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present application relates to a method, an apparatus, and a system for processing data, and in particular, to a method, an apparatus, and a system for coding and modulating data.

BACKGROUND

At present, a digital processing unit in a wireless transmission device mainly includes a baseband unit and an analog-to-digital (A/D)/digital-to-analog (D/A) conversion device. During data communication between a transmitter and a receiver, data is transmitted in the form of a digital signal or an analog signal. Therefore, conversion between digital signals and analog signals needs to be performed. Using a base station as a transmitter and a wireless terminal as a receiver for example, signal processing implemented by the digital processing unit is as follows: The baseband unit of the base station processes the digital signals, and the digital-to-analog conversion device converts the processed digital signals into analog signals and sends the analog signals to the wireless terminal.

Processing the digital signals by the baseband unit mainly refers to data coding and modulation. A baseband unit includes a Central Processing Unit (CPU), a channel coder, a digital signal processor, a modulator/demodulator, and an interface module. A data coding and modulation process is as follows: First, the CPU controls the interface module to receive digital signals; the channel coder codes the data to obtain coded data in a specific coding format; then the digital signal processor obtains the coded data from the channel coder, and controls the modulator/demodulator to perform data modulation on the coded data according to different modulation manners. The radio service traffic to be processed increases exponentially. Therefore, the percentage of the power consumption of the digital processing unit in the total power consumption of the entire base station gradually increases. It is estimated that in a long term evolution-advanced (LTE-A) system, the power consumption of the digital processing unit will account for more than 30% of the total power consumption of the entire base station. Therefore, how to reduce the power consumption of the digital processing unit will become an important subject for improving energy efficiency of the base station.

Figure 1:
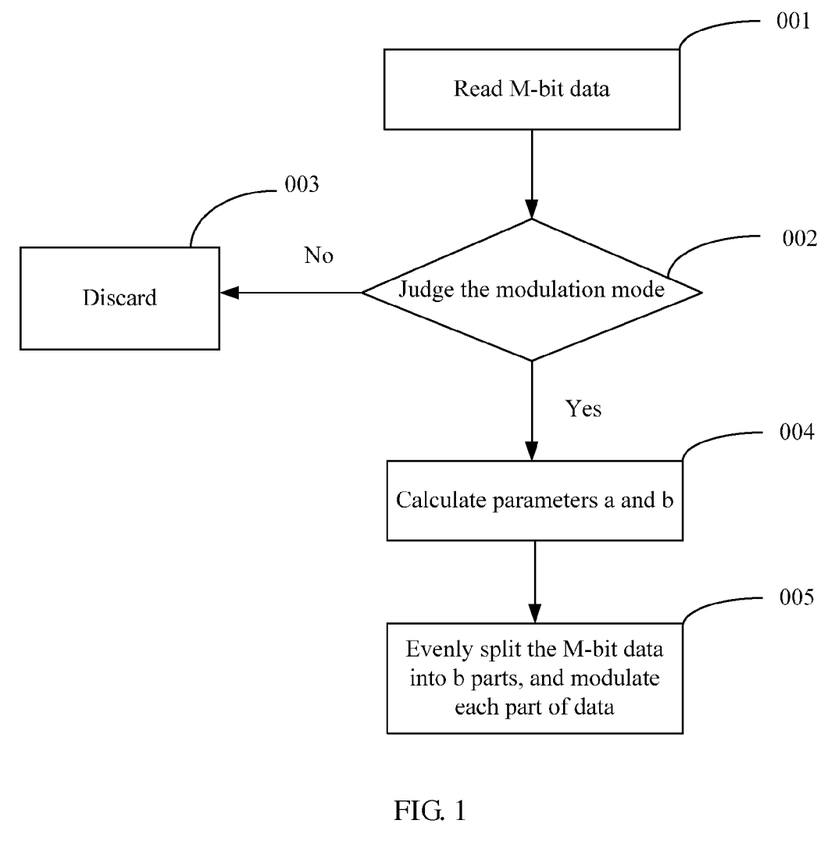
FIG. 1 is a flowchart of a method for coding and modulating data in the prior art.

As shown in FIG. 1, a flowchart of a method for coding and modulating data in fixed bitwidth manner in the prior art is illustrated. The method for coding and modulating data using the fixed bitwidth includes the following steps:

Step 001: For a wireless terminal, the digital signal processor of the baseband obtains M-bit data sent by the wireless terminal from the channel coder.

In this step, the data bitwidth output once by the channel coder is determined by a coding rate, and the data bitwidth output once by the channel coder is represented by the number of bits; and the data volume required for the digital processing unit to perform modulation once is also represented by the number of bits, where M is a common multiple of the data bitwidth output once by the channel coder and the data volume required for the digital processing unit to perform modulation once.

Step 002: The digital signal processor judges, according to the data modulation manner of the wireless terminal, whether the data modulation manner of the wireless terminal is one of the modulation manners supported by the digital processing unit of the base station. If the data modulation manner of the wireless terminal is one of the modulation modes supported by the digital processing unit of the base station, step 004 is performed; otherwise, step 003 is performed and the data is discarded.

In this step, the data modulation manner of the wireless terminal may be obtained from the wireless terminal, or from packet information carried in the M-bit data.

Step 004: Calculate parameters a and b.

In this step, a is the number of bits required for performing modulation once according to the data modulation manner of the wireless terminal; after a is obtained according to the data modulation manner of the wireless terminal, parameter b is calculated as: b=M/a.

Step 005: Evenly split the M-bit data read in step 001 into b parts, and perform data modulation respectively on each part of data.

In this step, the modulation order corresponding to each modulation bitwidth is preset in the base station, and the digital processing unit codes and modulates each part of data according to a modulation bitwidth a, the corresponding modulation order and coding rate corresponding to a modulation bitwidth a.

For a wireless transmission device where the wireless terminal is used as the receiver and the base station is used as the transmitter, the prior art cannot better solve the problem of low utilization of the digital processing unit with respect to how to properly use the digital processing unit. This is because, during data coding and modulation, the digital processing unit can only determine a fixed bitwidth according to the data modulation manner of the wireless terminal, and the digital processing unit is controlled, according to the modulation order and coding rate corresponding to the fixed bitwidth, to code and modulate the data. However, wireless terminals not having a high requirement for signal quality only need to receive signals modulated using a small bitwidth and low modulation order, which is sent by the base station, to meet their communication requirements. For the base station, low-order modulation using a small bitwidth facilitates reduction of the power consumption of the transmitter. In addition, the precision of the supported bitwidth of the wireless terminal may be far smaller than the fixed bitwidth of the base station. Therefore, when the base station, as the transmitter, codes and modulates, according to the fixed bitwidth, modulation order, and coding rate, the data sent to the wireless terminal, the signal quality of the wireless terminal is not improved and power consumption of the base station is increased, resulting in overdesign of the bitwidth of the existing digital processing unit.

SUMMARY

Embodiments of the present application provide a method, an apparatus, and a system for coding and modulating data, capable of reducing power consumption of a digital processing unit at the transmitter.

The embodiments of the present application are implemented as follows:

A method for coding and modulating data is provided, where the method includes: obtaining, from a receiver and a transmitter, parameters for calculating power consumption of the transmitter; calculating, according to the parameters, the power consumption of the transmitter under various combinations of modulation orders and coding rates supported by the transmitter; and selecting a bitwidth, modulation order, and coding rate corresponding to minimum power consumption of the transmitter to code and modulate data sent to the receiver.

The parameters include a supported bitwidth fed back by the receiver and a bitwidth feature of the transmitter.

The calculating, according to the parameters, the power consumption of the transmitter under various combinations of modulation orders and coding rates supported by the transmitter is: determining an upper bitwidth threshold according to the supported bitwidth of the receiver, obtaining a quantized noise of the transmitter by calculation, and using a bitwidth corresponding to the quantized noise as a lower bitwidth threshold; and in a range between the upper bitwidth threshold and the lower bitwidth threshold, selecting a plurality of available bitwidths of the transmitter, and respectively calculating power consumption of the transmitter under the plurality of available bitwidths of the transmitter.

The supported bitwidth of the receiver is a minimum value of a baseband bitwidth of the receiver, a bitwidth supported by analog-to-digital conversion, and a bitwidth supported by digital-to-analog conversion.

The plurality of available bitwidths of the transmitter is selected according to the bitwidth feature of the transmitter.

The parameters further include a supported minimum received signal-to-noise ratio fed back by the receiver, detected channel quality, a service demand of the receiver which is obtained by a scheduling result of the receiver, and supported maximum transmit power fed back by the transmitter.

The calculating power consumption of the transmitter under the available bitwidths of the transmitter is: multiplying a transmit power of the transmitter by transmission time, where: the transmit power of the transmitter is a product obtained by multiplying a minimum transmit signal-to-noise ratio supported by the transmitter by the sum of the quantized noise and a white noise; the minimum transmit signal-to-noise ratio is a quotient obtained by dividing the supported minimum received signal-to-noise ratio fed back by the receiver by the detected channel quality; and the transmission time is a quotient obtained by dividing the service demand of the receiver by a product of a corresponding modulation order and coding rate.

The process of obtaining a quantized noise of the transmitter by calculation is: obtaining the quantized noise of the transmitter by calculation according to the supported minimum received signal-to-noise ratio fed back by the receiver, the detected channel quality, and the maximum transmit power supported by the transmitter.

The process of coding and modulating data further includes: fully padding the bitwidth corresponding to the selected minimum power consumption of the transmitter to attain a bitwidth set for subsequent time-domain modulation, and modulating the data sent to the receiver by using the padded bitwidth, the modulation order, and the coding rate.

A system for coding and modulating data is provided, where the system includes: a receiver and a transmitter.

The transmitter is configured to: obtain, from the receiver and the transmitter, parameters for calculating power consumption of the transmitter; calculate, according to the parameters, the power consumption of the transmitter under various combinations of modulation orders and coding rates supported by the transmitter; and select a bitwidth, modulation order, and coding rate corresponding to minimum power consumption of the transmitter to code and modulate data sent to the receiver.

The receiver is configured to receive the data after coding and modulation from the transmitter.

The transmitter includes a radio resource management unit and a digital processing unit.

The radio resource management unit further includes a radio resource management subunit and a bitwidth control subunit.

The radio resource management subunit is configured to: under various combinations of modulation orders and coding rates supported by the transmitter, determine an upper bitwidth threshold according to a supported bitwidth of the receiver; obtain a quantized noise of the transmitter by calculation according to a supported minimum received signal-to-noise ratio fed back by the receiver, detected channel quality, and maximum transmit power supported by the transmitter; and use a bitwidth corresponding to the quantized noise as a lower bitwidth threshold; and in a range between the upper bitwidth threshold and the lower bitwidth threshold, select a plurality of available bitwidths of the transmitter according to a bitwidth feature of the transmitter which is sent by the digital processing unit; respectively calculate power consumption of the transmitter under the plurality of available bitwidths of the transmitter according to a service demand and channel quality of the receiver; select minimum power consumption of the transmitter in the power consumption of the transmitter under the plurality of available bitwidths of the transmitter; and send a bitwidth, modulation order, and coding rate corresponding to the selected minimum power consumption of the transmitter to the bitwidth control subunit.

The bitwidth control subunit is configured to control, according to the bitwidth, modulation order, and coding rate sent by the radio resource management subunit, the digital processing unit to make an adjustment to the bitwidth, modulation order, and coding rate.

The digital processing unit is configured to: send the bitwidth feature of the transmitter to the radio resource management subunit; and code and modulate, according to the bitwidth, modulation order, and coding rate corresponding to the minimum power consumption of the transmitter, the data sent to the receiver.

The receiver is further configured to: send a minimum value of a baseband bitwidth of the receiver, a bitwidth supported by analog-to-digital conversion, and a bitwidth supported by digital-to-analog conversion as a supported bitwidth of the receiver to the radio resource management subunit.

A transmitter apparatus for coding and modulating data is provided, where the apparatus includes: a radio resource management unit and a digital processing unit.

The radio resource management unit is configured to: obtain, from a receiver and a transmitter, parameters for calculating power consumption of the transmitter, and calculate, according to the parameters, the power consumption of the transmitter under various combinations of modulation orders and coding rates supported by the transmitter; and select a bitwidth, modulation order, and coding rate corresponding to minimum power consumption of the transmitter; and control the digital processing unit to code and modulate, according to the bitwidth, modulation order, and coding rate corresponding to the minimum power consumption of the transmitter, data sent to the receiver.

The digital processing unit is configured to code and modulate, according to the bitwidth, modulation order, and coding rate corresponding to the minimum power consumption of the transmitter, the data sent to the receiver.

The radio resource management unit further includes a radio resource management subunit and a bitwidth control subunit.

The radio resource management subunit is configured to: under various combinations of modulation orders and coding rates supported by the transmitter, determine an upper bitwidth threshold according to a supported bitwidth of the receiver; obtain a quantized noise of the transmitter by calculation according to a supported minimum received signal-to-noise ratio fed back by the receiver, detected channel quality, and maximum transmit power supported by the transmitter; and use a bitwidth corresponding to the quantized noise as a lower bitwidth threshold; and in a range between the upper bitwidth threshold and the lower bitwidth threshold, select a plurality of available bitwidths of the transmitter according to a bitwidth feature of the transmitter which is sent by the digital processing unit; respectively calculate power consumption of the transmitter under the plurality of available bitwidths of the transmitter according to a service demand and channel quality of the receiver; select minimum power consumption of the transmitter in the power consumption of the transmitter under the plurality of available bitwidths of the transmitter; and send a bitwidth, modulation order, and coding rate corresponding to the selected minimum power consumption of the transmitter to the bitwidth control subunit.

The bitwidth control subunit is configured to control, according to the bitwidth, modulation order, and coding rate sent by the radio resource management subunit, the digital processing unit to make an adjustment to the bitwidth, modulation order, and coding rate.

The digital processing unit is further configured to send the bitwidth feature of the transmitter to the radio resource management subunit.

The radio resource management subunit is further configured to use a minimum value of a baseband bitwidth of the receiver, a bitwidth supported by analog-to-digital conversion, and a bitwidth supported by digital-to-analog conversion as a supported bitwidth of the receiver.

It can be seen from the above technical solutions that, by using the method, apparatus, and system for coding and modulating data according to the embodiments of the present application, for a receiver, power consumption of a transmitter under all combinations of modulation orders and coding rates supported by the transmitter is calculated, and a bitwidth, modulation order, and coding rate corresponding to minimum power consumption of the transmitter is selected to code and modulate data. In this way, energy utilization of a wireless device having a digital processing unit is greatly improved, and power consumption of the transmitter for coding and modulating data is reduced.

DETAILED DESCRIPTION

To make the objectives, technical solutions, and advantages of the embodiments of the present application more comprehensible, the following further describes the embodiments of the present application in detail with reference to the accompanying drawings.

Figure 2:
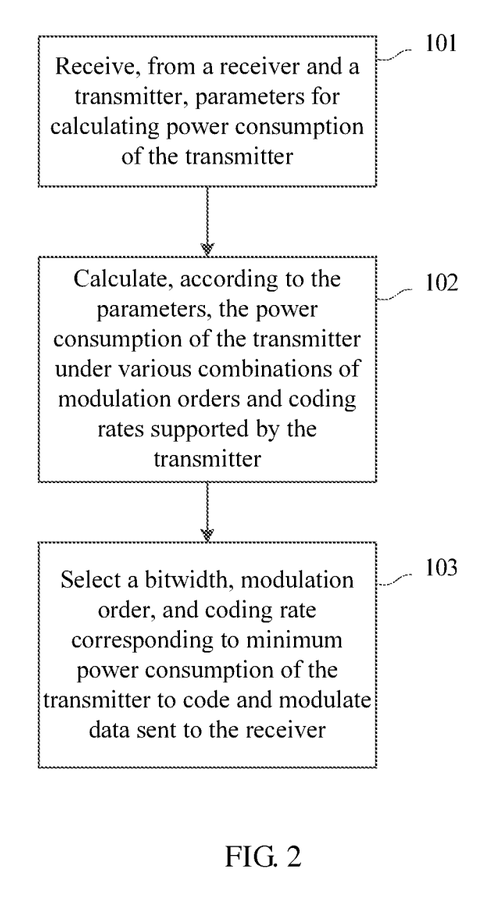
FIG. 2 is a flowchart of steps in a method for coding and modulating data according to an embodiment of the present application.

As shown in FIG. 2, a method for coding and modulating data is provided, where the method includes:

Step 101: Receive, from a receiver and a transmitter, parameters for calculating power consumption of the transmitter.

Step 102: Calculate, according to the parameters, the power consumption of the transmitter under various combinations of modulation orders and coding rates supported by the transmitter.

Step 103: Select a bitwidth, modulation order, and coding rate corresponding to minimum power consumption of the transmitter to code and modulate data sent to the receiver.

A supported bitwidth fed back by the receiver and a bitwidth feature of the transmitter may also be obtained to further reduce the calculation workload.

Furthermore, the step of calculating the power consumption of the transmitter is as follows:

First, an upper bitwidth threshold is determined according to the supported bitwidth of the receiver, a quantized noise of the transmitter is obtained by calculation, and a bitwidth corresponding to the quantized noise is used as a lower bitwidth threshold.

The supported bitwidth of the receiver is a minimum value of a baseband bitwidth of the receiver, a bitwidth supported by analog-to-digital conversion, and a bitwidth supported by digital-to-analog conversion; and a plurality of available bitwidths of the transmitter are selected according to the bitwidth feature of the transmitter. Under the prerequisite that the requirement for the signal-to-noise ratio of the received data is satisfied for the receiver, the range of available bitwidths of the transmitter is reduced as much as possible, the workload for subsequently calculating power consumption of the transmitter is reduced, and the calculation time is shortened.

Then, in the range between the upper bitwidth threshold and the lower bitwidth threshold, a plurality of available bitwidths of the transmitter are selected, and power consumption of the transmitter under the plurality of available bitwidths of the transmitter is calculated respectively.

The parameters required for calculating transmit power consumption under the available bitwidths of the transmitter further include a supported minimum received signal-to-noise ratio fed back by the receiver, detected channel quality, a service demand of the receiver obtained by a scheduling result of the receiver, and maximum transmit power supported by the transmitter which is fed back by the transmitter.

The specific method for calculating power consumption of the transmitter under the available bitwidths of the transmitter is: multiplying a transmit power of the transmitter by transmission time.

The transmit power of the transmitter is a product obtained by multiplying a minimum transmit signal-to-noise ratio supported by the transmitter by the sum of the quantized noise and a white noise.

The minimum transmit signal-to-noise ratio supported by the transmitter is a quotient obtained by dividing a supported minimum received signal-to-noise ratio fed back by the receiver by the channel quality.

The transmission time is a quotient obtained by dividing the service demand of the receiver by the product of a corresponding modulation order and coding rate.

The quantized noise of the transmitter is calculated according to the supported minimum received signal-to-noise ratio fed back by the receiver, the detected channel quality, and the maximum transmit power supported by the transmitter.

According to the embodiment of the present application, the process of coding and modulating data further includes: fully padding the bitwidth corresponding to the selected minimum power consumption of the transmitter to attain a bitwidth set for subsequent time-domain modulation, and coding and modulating the data sent to the receiver by using the padded bitwidth, the modulation order, and the coding rate.

Based on the method for coding and modulating data according to the above embodiment of the present application, an embodiment of the present application provides a system for coding and modulating data, where the system includes: a transmitter and a receiver.

The transmitter is configured to: obtain, from the receiver and the transmitter, parameters for calculating power consumption of the transmitter; calculate, according to the parameters, the power consumption of the transmitter under various combinations of modulation orders and coding rates supported by the transmitter; and select a bitwidth, modulation order, and coding rate corresponding to minimum power consumption of the transmitter to code and modulate data sent to the receiver.

The receiver is configured to receive the data after coding and modulation from the transmitter.

In the system for coding and modulating data according to the embodiment of the present application, the transmitter includes a radio resource management unit and a digital processing unit.

The radio resource management unit further includes a radio resource management subunit and a bitwidth control subunit.

The radio resource management subunit is configured to: under various combinations of modulation orders and coding rates supported by the transmitter, determine an upper bitwidth threshold according to a supported bitwidth of the receiver; obtain a quantized noise of the transmitter by calculation according to a supported minimum received signal-to-noise ratio fed back by the receiver, detected channel quality, and maximum transmit power supported by the transmitter; and use a bitwidth corresponding to the quantized noise as a lower bitwidth threshold; and in a range between the upper bitwidth threshold and the lower bitwidth threshold, select a plurality of available bitwidths of the transmitter according to a bitwidth feature of the transmitter which is sent by the digital processing unit; respectively calculate power consumption of the transmitter under the plurality of available bitwidths of the transmitter according to a service demand and channel quality of the receiver; select minimum power consumption of the transmitter in the power consumption of the transmitter under the plurality of available bitwidths of the transmitter; and send a bitwidth, modulation order, and coding rate corresponding to the selected minimum power consumption of the transmitter to the bitwidth control subunit.

The bitwidth control subunit is configured to control, according to the bitwidth, modulation order, and coding rate sent by the radio resource management subunit, the digital processing unit to make an adjustment to the bitwidth, modulation order, and coding rate.

The digital processing unit is configured to: send the bitwidth feature of the transmitter to the radio resource management subunit; and code and modulate, according to the bitwidth, modulation order, and coding rate corresponding to the minimum power consumption of the transmitter, the data sent to the receiver.

The receiver is further configured to: send a minimum value of a baseband bitwidth of the receiver, a bitwidth supported by analog-to-digital conversion, and a bitwidth supported by digital-to-analog conversion as a supported bitwidth of the receiver to the radio resource management subunit.

A transmitter apparatus for coding and modulating data is provided, where the apparatus includes: a radio resource management unit and a digital processing unit.

The radio resource management unit is configured to: obtain, from a receiver and a transmitter, parameters for calculating power consumption of the transmitter; calculate, according to the parameters, the power consumption of the transmitter under various combinations of modulation orders and coding rates supported by the transmitter; select a bitwidth, modulation order, and coding rate corresponding to minimum power consumption of the transmitter; and control the digital processing unit to code and modulate, according to the bitwidth, modulation order, and coding rate corresponding to the minimum power consumption of the transmitter, data sent to the receiver.

The digital processing unit is configured to code and modulate, according to the bitwidth, modulation order, and coding rate corresponding to the minimum power consumption of the transmitter, the data sent to the receiver.

The radio resource management unit further includes a radio resource management subunit and a bitwidth control subunit.

The radio resource management subunit is configured to: under various combinations of modulation orders and coding rates supported by the transmitter, determine an upper bitwidth threshold according to a supported bitwidth of the receiver; obtain a quantized noise of the transmitter by calculation according to a supported minimum received signal-to-noise ratio fed back by the receiver, detected channel quality, and maximum transmit power supported by the transmitter; and use a bitwidth corresponding to the quantized noise as a lower bitwidth threshold; and in a range between the upper bitwidth threshold and the lower bitwidth threshold, select a plurality of available bitwidths of the transmitter according to a bitwidth feature of the transmitter which is sent by the digital processing unit; respectively calculate power consumption of the transmitter under the plurality of available bitwidths of the transmitter according to a service demand and channel quality of the receiver; select minimum power consumption of the transmitter in the power consumption of the transmitter under the plurality of available bitwidths of the transmitter; and send a bitwidth, modulation order, and coding rate corresponding to the selected minimum power consumption of the transmitter to the bitwidth control subunit.

The bitwidth control subunit is configured to control, according to the bitwidth, modulation order, and coding rate sent by the radio resource management subunit, the digital processing unit to make an adjustment to the bitwidth, modulation order, and coding rate.

The digital processing unit is further configured to send the bitwidth feature of the transmitter to the radio resource management subunit.

The radio resource management subunit is further configured to use a minimum value of a baseband bitwidth of the receiver, a bitwidth supported by analog-to-digital conversion, and a bitwidth supported by digital-to-analog conversion as a supported bitwidth of the receiver.

It can be seen from the method, apparatus, and system for coding and modulating data provided in the embodiments of the present application, by using the method, apparatus, and system, for a receiver, power consumption of a transmitter under all combinations of modulation orders and coding rates supported by the transmitter is calculated, and a bitwidth, modulation order, and coding rate corresponding to minimum power consumption of the transmitter is selected to code and modulate data.

During the process of calculating the power consumption of the transmitter, for each combination of the modulation order and coding rate supported by the transmitter, in one aspect, an upper bitwidth threshold of the transmitter is determined according to the supported bitwidth fed back by the receiver; in another aspect, a quantized noise of the transmitter is calculated according to a minimum received signal-to-noise ratio and channel quality of the receiver, and a bitwidth corresponding to the quantized noise is used as a lower bitwidth threshold; and in the range between the upper and lower bitwidth thresholds, power consumption of the transmitter which is corresponding to different available bitwidths supported by the transmitter is calculated according to a bitwidth feature of the transmitter, a service demand, and channel quality of the receiver.

This method overcomes the defect that, in the prior art, the power consumption when the transmitter is controlled according to the modulation manner of the receiver to select the corresponding fixed bitwidth, modulation order, and coding rate to code and modulate data is too great, and that the bitwidth is "overdesigned."

Embodiment 1

Figure 3:
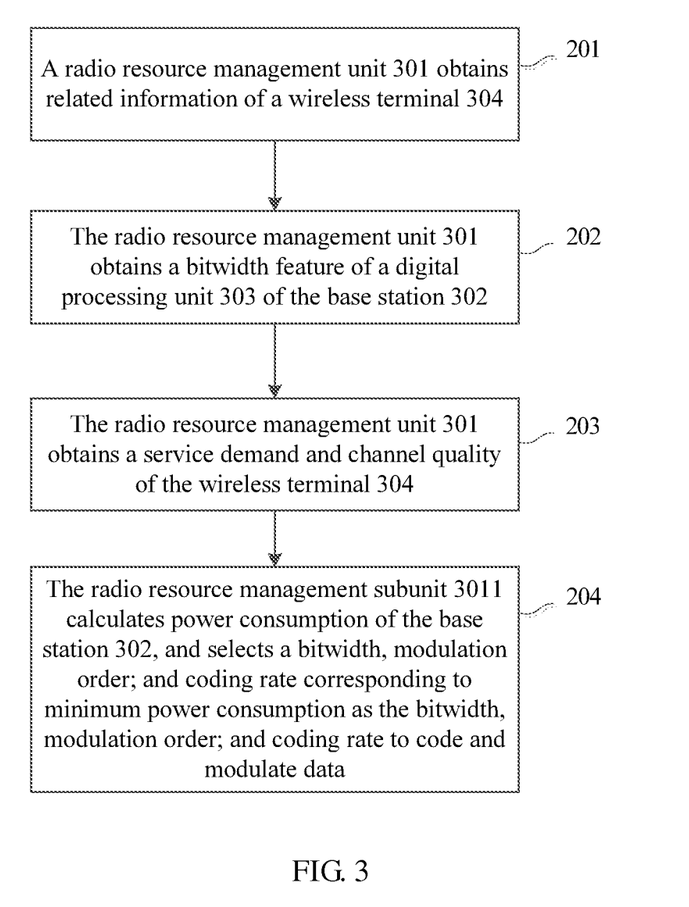
FIG. 3 is a flowchart of a method for coding and modulating data based on a global system for mobile communications according to an embodiment of the present application.
Figure 4:
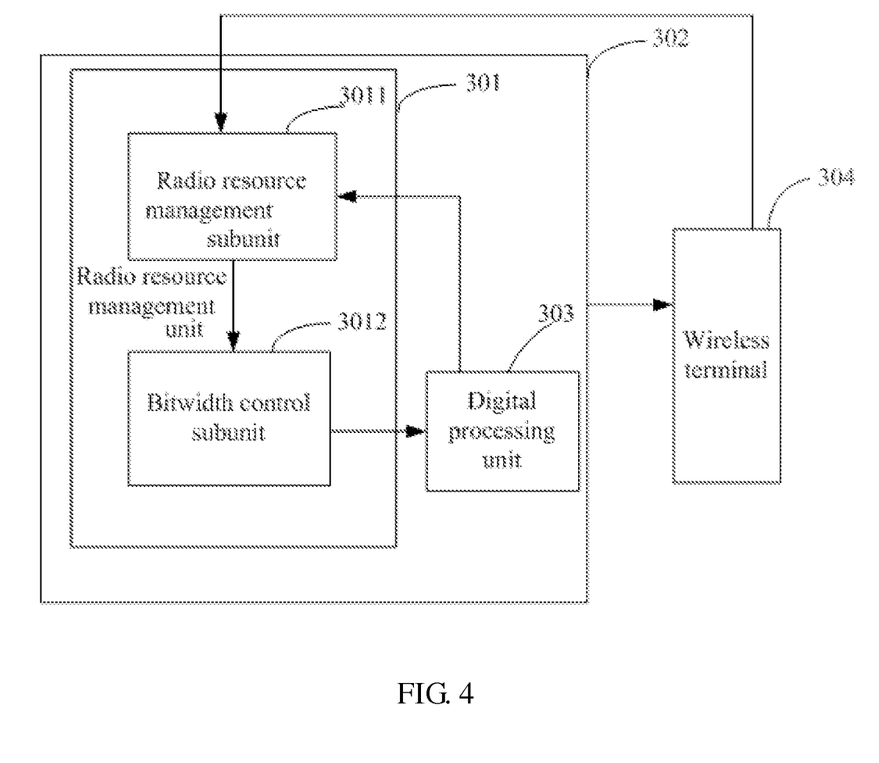
FIG. 4 is a structural diagram of a system for coding and modulating data based on a global system for mobile communications according to an embodiment of the present application.

With reference to a structural diagram of a system for coding and modulating data based on a global system for mobile communications (GSM) as shown in FIG. 4, the following describes the method for coding and modulating data based on the GSM as shown in FIG. 3 in detail. The steps are specifically as follows:

Step 201: A radio resource management unit 301 obtains related information of a wireless terminal 304.

In this step, for the GSM, a transmitter is a base station 302, and a receiver is the wireless terminal 304. Specifically, a radio resource management subunit 3011 of the radio resource management unit 301 obtains the related information of the wireless terminal 304, where the related information of wireless terminal 304 includes a supported bitwidth and sensitivity of the wireless terminal 304. The supported bitwidth is a minimum value of a baseband bitwidth of a digital processing unit of the wireless terminal 304, a bitwidth supported by A/D conversion, and a bitwidth supported by D/A conversion.

In this step, the related information of the wireless terminal 304 may be obtained in a plurality of implementation manners, including:

Implementation manner 1: When the wireless terminal 304 registers in the base station 302, signaling is added to inform the radio resource management unit 301 of the related information used by the wireless terminal 304.

Implementation manner 2: Before the base station 302 sends related services, the wireless terminal 304 is queried, and the wireless terminal 304 reports related information used by the wireless terminal to the radio resource management unit 301 according to a query result.

Implementation manner 3: Default related information is preset in the radio resource management unit 301; the radio resource management unit 301 controls the base station 302 to broadcast the currently preset default related information to all wireless terminals 304; the wireless terminal 304 judges whether the current related information complies with the default related information; if the current information complies with the default related information, no information is fed back; and if the current information does not comply with the default related information, the current related information of the wireless terminal 304 is fed back to the radio resource management unit 301. It should be noted that, for the wireless terminal 304 not feeding back the related information, the subsequent steps are performed by using the default related information preset in the radio resource management unit 301 as the related information of the wireless terminal 304.

The supported bitwidth and sensitivity of the wireless terminal 304 will not change during transmission. Therefore, the supported bitwidth and receiving sensitivity may be recorded by using a signaling process initiated at power-on and registration of the wireless terminal 304. Accordingly, obtaining the supported bitwidth and sensitivity of the wireless terminal 304 will not notably increase the system load of the wireless device.

In addition, in this step, the time and period for obtaining the supported bitwidth and sensitivity of the wireless terminal 304 are the same as the time and period for positioning the wireless terminal 304 or obtaining the communication manner of the wireless terminal 304 in the prior art. The details are not described here again.

Step 202: The radio resource management unit 301 obtains a bitwidth feature of a digital processing unit 303 of the base station 302.

In this step, the radio resource management subunit 3011 obtains the bitwidth feature of the digital processing unit 303 of the base station 302.

The bitwidth feature of the digital processing unit 303 of the base station 302 refers to values of a plurality of modulation bitwidths W supported by the base station 302, which are inherent information of the base station 302 and located in the digital processing unit 303 of the base station 302. As a specific implementation manner, the bitwidth feature of the digital processing unit 303 of the base station 302 is pre-stored in a storage unit of the digital processing unit 303, and the radio resource management unit 301 can read, as required, the bitwidth feature of the digital processing unit 303 of the base station 302 from the storage unit.

Step 203: The radio resource management unit 301 obtains a service demand and channel quality of the wireless terminal 304.

In this step, the radio resource management subunit 3011 obtains the service demand and channel quality of the wireless terminal 304.

The service demand C of the wireless terminal 304 may be obtained from a scheduling result of the receiver. The radio resource management subunit 3011 directly obtains the data volume of the service demand C and the channel quality fed back by the wireless terminal 304. The specific obtaining manner, time, period, and so on are all based on the prior art, and are not described here again.

It should be noted that, the sequence of step 201, step 202, and step 203 may be set randomly and any sequence of the three steps makes little difference, which is not limited to the sequence described in this embodiment.

Step 204: The radio resource management subunit 3011 calculates power consumption of the base station 302, and selects a bitwidth, modulation order, and coding rate corresponding to minimum power consumption as the bitwidth, modulation order, and coding rate to code and modulate data.

In this step, the radio resource management subunit 3011 in the radio resource management unit 301 obtains the power consumption of the digital processing unit 303 of the base station 302 by calculation according to the input results in steps 201 to 203.

The process of calculating the power consumption of the base station 302 is specifically as follows:

First, because a minimum received signal-to-noise ratio of the wireless terminal is related to a modulation order Q and coding rate R of the base station, under each combination of the modulation order Q and coding rate R of the base station 302, the corresponding minimum received signal-to-noise ratio of the wireless terminal 304 is respectively calculated. The minimum received signal-to-noise ratio of the wireless terminal 304 may be obtained by calculation according to the receiver sensitivity obtained in step 201, or may be obtained by estimation according to the minimum received signal-to-noise ratio per bit corresponding to each combination of the modulation order Q and coding rate R.

Then, a minimum transmit signal-to-noise ratio corresponding to each combination of the modulation order Q and coding rate R is calculated according to the relationship between the minimum received signal-to-noise ratio and the minimum transmit signal-to-noise ratio and the channel quality.

Specifically, minimum transmit signal-to-noise ratio=minimum received signal-to-noise ratio/channel quality. Channel quality=long term path loss×shadow attenuation×instant channel condition, where the above three parameters can be obtained from the receiver by using a terminal measurement and feedback mechanism, and are not described here again. A quantized noise is obtained by dividing a maximum transmit power of the base station by the minimum transmit signal-to-noise ratio, where the maximum transmit power of the base station can be obtained from the feedback of the base station 302. The mapping relationship between the quantized noise and a modulation bitwidth W may be obtained from related documents in the prior art according to a quantization manner. For example, in the case of uniform quantization, quantized noise=$1/(12 \times \text{Delta}^2)$, where Delta refers to the quantization precision. For example, for quantization with the modulation bitwidth W being 12 bits, quantization precision Delta=signal range/$2^{12}$. Under each combination of the modulation order Q and coding rate R, the modulation bitwidth corresponding to the quantized noise can be used as a lower threshold Wmin of the modulation bitwidth and the supported bitwidth of the wireless terminal 304 can be used as an upper threshold Wmax of the modulation bitwidth W, so that the range of the modulation bitwidth W is determined.

In the range between the modulation bitwidth upper threshold Wmax and the lower threshold Wmin of the modulation bitwidth, one or a plurality of modulation bitwidths meeting the bitwidth feature of the digital processing unit 303 of the base station 302 in step 202 are found and used as available bitwidths, and the power consumption of the digital processing unit 303 of the base station 302 with the available bitwidth under each combination of the modulation order Q and coding rate R is respectively calculated.

For example, under one combination of the modulation order Q1 and coding rate R1, if modulation bitwidths W1, W2, and W3 are available, the power consumption of the digital processing unit 303 of the base station 302 under each combination of the modulation order Q1 and coding rate R1 and each of the modulation bitwidths W1, W2, and W3 needs to be calculated. The method is specifically as follows.

The power consumption of the digital processing unit 303 of the base station 302 is equal to the product obtained by multiplying the transmit power of the digital processing unit 303 of the base station 302 by the transmission time:

$$P(Q,R,W)*T(C,Q,R)$$

where P(Q,R,W) is the transmit power of the digital processing unit 303 of the base station 302, and P(Q,R,W) is the minimum transmit signal-to-noise ratio×(quantized noise+white noise), where measurement of the white noise pertains to the prior art and is not described here again;

where T(C,Q,R) indicates the transmission time, and the calculation formula is:

$$T(C,Q,R)=C/(Q*R),$$

where C indicates the service demand, Q indicates the modulation order, and R indicates the coding rate.

According to the above scheduling method, the transmit power consumption of the digital processing unit 303 of the base station 302 under all combinations of different modulation orders Q and coding rates R, for example, a combination of a modulation order Q2 and coding rate R2 and a combination of a modulation order Q3 and coding rate R3, is further calculated; and the bitwidth, modulation order, and coding rate corresponding to the minimum value of the transmit power consumption of the digital processing unit 303 of the base station 302 are used as the bitwidth, modulation order, and coding rate to code and modulate frequency-domain data.

The radio resource management subunit 3011 sends the obtained bitwidth, modulation order, and coding rate to a bitwidth control subunit 3012 of the radio resource management unit 301. The bitwidth control subunit 3012 controls the digital processing unit 303 of the base station 302 and enable the digital processing unit 303 to make an adjustment to the bitwidth, modulation order, and coding rate.

The subsequent steps further include: The digital processing unit 303 of the base station 302 codes and modulates data according to the bitwidth, modulation order, and coding rate to obtain the modulated data, and sends the modulated data to the wireless terminal 304; the wireless terminal 304 demodulates the received modulated data; and so on.

Up to now, all steps in the method for coding and modulating data based on the GSM illustrated in Embodiment 1 of the present application are completed.

It should be noted that, in this embodiment, the radio resource management unit 301 and the digital processing unit 303 are both located in the base station 302. In addition, the radio resource management unit 301 may also be located in a controller of the base station 302, and the controller and the base station 302 constitute the transmitter.

Embodiment 2

During coding and modulation of baseband data, to meet different requirements, the data needs to be transformed to a frequency domain or time domain for analysis and processing. The time domain is a function of data to time of the data, and the frequency domain is a function of data to frequency of the data. Transform between the frequency domain and the time domain may be implemented according to a data type by using the integral transform method in mathematics. The following describes a method for coding and modulating data based on a long term evolution (LTE), for example, an orthogonal frequency division multiple access (OFDMA) system, according to an embodiment of the present application. The steps are specifically as follows.

The maximum bitwidth requirement input by a baseband in the fast Fourier transform (FFT) and inverse fast Fourier transform (IFFT) operations determines the operation unit requirement. Therefore, during transform from the frequency domain to the time domain in data coding and modulation, the bitwidth of the data needs to be fully padded. In this embodiment, after the frequency-domain data is coded and modulated by using the steps in Embodiment 1, "0" needs to be added to fully pad the bitwidth corresponding the selected minimum power consumption of the transmitter to reach the bitwidth set for the time-domain modulation before the step of coding and modulating the time-domain data. After the uniform bitwidth is input into an IFFT module, the data sent to the receiver is modulated by using the fully padded bitwidth, and the modulation order and coding rate during coding and modulation of the frequency-domain data.

It can be seen from the above embodiments that the present application is independent of specific modes at a physical layer, and is applicable to various cellular network modes, multi-antenna systems, and so on, having a wide application scope. In addition, the present application does not affect the transmission process of the transmitter and the receiving process of the receiver, is fully compatible with the receiver, and does not affect any performance of the receiver.

A method, an apparatus, and a system for coding and modulating data are provided and by using the method, apparatus, and system for coding and modulating data, the bitwidth, modulation order, and coding rate corresponding to the minimum power consumption supported by the transmitter are selected according to the supported bitwidth of the receiver, minimum transmit signal-to-noise ratio, service demand, and channel quality, and based on the maximum transmit power of the transmitter and the bitwidth feature of the digital processing unit, so as to code and modulate the data sent to the receiver. In this way, power consumption of the transmitter is saved, and energy utilization of a wireless device having a digital processing unit is greatly improved.

The above descriptions are merely exemplary embodiments of the present application, but are not intended to limit the present application. Any modification, equivalent replacement, or improvement made within the principle of the present application should fall within the protection scope of the present application.

What is claimed is:
1. A method for coding and modulating data comprising:
obtaining, from a receiver and a transmitter, parameters for calculating power consumption of the transmitter;
calculating, according to the parameters, the power consumption of the transmitter under various combinations of modulation orders and coding rates supported by the transmitter; and
selecting a bitwidth, modulation order, and coding rate corresponding to minimum power consumption of the transmitter to code and modulate data sent to the receiver,
wherein the parameters comprise a supported bitwidth fed back b the receiver and a bitwidth feature of the transmitter, and
wherein the supported bitwidth of the receiver comprises a minimum value of a baseband bitwidth of the receiver, a bitwidth supported analo-to-digital conversion, and a bitwidth supported by digital-to-analog conversion.

2. The method according to claim 1, wherein the power consumption of the transmitter is calculated based at least in part on multiplying a transmit power of the transmitter by a transmission time.

3. The method according to claim 2, wherein the transmit power of the transmitter comprises a product obtained by multiplying a minimum transmit signal-to-noise ratio supported by the transmitter by a sum of quantized noise and a white noise.

4. The method according to claim 3, wherein the minimum transmit signal-to-noise ratio comprises a quotient obtained by dividing a supported minimum received signal-to-noise ratio fed back by the receiver by a channel quality.

5. The method according to claim 2, wherein the transmission time comprises a quotient obtained by dividing a service demand of the receiver by a product of a corresponding modulation order and coding rate.

6. A method for coding and modulating data comprising:
obtaining, from a receiver and a transmitter, parameters for calculating power consumption of the transmitter;
calculating, according to the parameters, the power consumption of the transmitter under various combinations of modulation orders and coding rates supported by the transmitter; and
selecting a bitwidth, modulation order, and coding rate corresponding to minimum power consumption of the transmitter to code and modulate data sent to the receiver,
wherein the parameters comprise a supported bitwidth fed back by the receiver and a bitwidth feature of the transmitter,
wherein calculating, according to the parameters, the power consumption of the transmitter under various combinations of modulation orders and coding rates supported by the transmitter comprises:
determining an upper bitwidth threshold according to the supported bitwidth of the receiver;
obtaining a quantized noise of the transmitter by calculation;
using a bitwidth corresponding to the quantized noise as a lower bitwidth threshold;
selecting a plurality of available bitwidths of the transmitter in a range between the upper bitwidth threshold and the lower bitwidth threshold; and
calculating power consumption of the transmitter under the plurality of available bitwidths of the transmitter.

7. The method according to claim 6, wherein the plurality of available bitwidths of the transmitter is selected according to the bitwidth feature of the transmitter.

8. The method according to claim 6, wherein the parameters further comprise a supported minimum received signal-to-noise ratio fed back by the receiver, a detected channel quality, a service demand of the receiver obtained by a scheduling result of the receiver, and a maximum transmit power supported by the transmitter and fed back by the transmitter.

9. The method according to claim 8, wherein calculating the power consumption of the transmitter under the available bitwidths of the transmitter comprises multiplying a transmit power of the transmitter by transmission time, wherein the transmit power of the transmitter comprises a product obtained by multiplying a minimum transmit signal-to-noise ratio supported by the transmitter by a sum of the quantized noise and a white noise, wherein the minimum transmit signal-to-noise ratio comprises a quotient obtained by dividing a supported minimum received signal-to-noise ratio fed back by the receiver by the detected channel quality, and wherein the transmission time comprises a quotient obtained by dividing the service demand of the receiver by a product of a corresponding modulation order and coding rate.

10. The method according to claim 9, wherein obtaining the quantized noise of the transmitter by calculation comprises calculating, according to the supported minimum received signal-to-noise ratio fed back by the receiver, the detected channel quality and the maximum transmit power supported by the transmitter.

11. A method for coding and modulating data comprising:
obtaining, from a receiver and a transmitter, parameters for calculating power consumption of the transmitter;
calculating, according to the parameters, the power consumption of the transmitter under various combinations of modulation orders and coding rates supported by the transmitter;
selecting a bitwidth, modulation order, and coding rate corresponding to minimum power consumption of the transmitter to code and modulate data sent to the receiver;
fully padding the bitwidth corresponding to the selected minimum power consumption of the transmitter to attain a bitwidth set for subsequent time-domain modulation; and
coding and modulating the data sent to the receiver by using the padded bitwidth, the modulation order, and the coding rate.

12. The method according to claim 11, wherein the power consumption of the transmitter is calculated based at least in part on multiplying a transmit power of the transmitter by a transmission time.

13. The method according to claim 12, wherein the transmit power of the transmitter comprises a product obtained by multiplying a minimum transmit signal-to-noise ratio supported by the transmitter by a sum of quantized noise and a white noise.

14. The method according to claim 13, wherein the minimum transmit signal-to-noise ratio comprises a quotient obtained by dividing a supported minimum received signal-to-noise ratio fed back by the receiver by a channel quality.

15. The method according to claim 12, wherein the transmission time comprises a quotient obtained by dividing a service demand of the receiver by a product of a corresponding modulation order and coding rate.

16. A system for coding and modulating data comprising:
a receiver; and
a transmitter,
wherein the transmitter is configured to obtain, from the receiver and the transmitter, parameters for calculating power consumption of the transmitter,
wherein the transmitter is configured to calculate, according to the parameters, the power consumption of the transmitter under various combinations of modulation orders and coding rates supported by the transmitter,
wherein the transmitter is configured to select a bitwidth, modulation order, and coding rate corresponding to minimum power consumption of the transmitter to code and modulate data sent to the receiver,
wherein the receiver is configured to receive the data after coding and modulation from the transmitter,
wherein the transmitter comprises a radio resource management unit and a digital processing unit,
wherein the radio resource management unit comprises a radio resource management subunit and a bitwidth control subunit,
wherein the radio resource management subunit is configured to:
determine, under various combinations of modulation orders and coding rates supported by the transmitter, an upper bitwidth threshold according to a supported bitwidth of the receiver;
obtain a quantized noise of the transmitter by calculation according to a supported minimum received signal-to-noise ratio fed back by the receiver, a detected channel quality, and a maximum transmit power supported by the transmitter;
use a bitwidth corresponding to the quantized noise as a lower bitwidth threshold;
select a plurality of available bitwidths of the transmitter in a range between the upper bitwidth threshold and the lower bitwidth threshold according to a bitwidth feature of the transmitter which is sent by the digital processing unit;
calculate power consumption of the transmitter under the plurality of available bitwidths of the transmitter according to a service demand and channel quality of the receiver;
select minimum power consumption of the transmitter in the power consumption of the transmitter under the plurality of available bitwidths of the transmitter; and
send a bitwidth, modulation order, and coding rate corresponding to the selected minimum power consumption of the transmitter to the bitwidth control subunit,
wherein the bitwidth control subunit is configured to control, according to the bitwidth, the modulation order, and the coding rate sent by the radio resource management subunit, the digital processing unit to use the bitwidth, the modulation order, and the coding rate, and
wherein the digital processing unit is configured to:
send the bitwidth feature of the transmitter to the radio resource management subunit; and
code and modulate, according to the bitwidth, the modulation order, and the coding rate corresponding to the minimum power consumption of the transmitter, the data sent to the receiver.

17. A system for coding and modulating data comprising:
a receiver; and
a transmitter,
wherein the transmitter is configured to obtain, from the receiver and the transmitter, parameters for calculating power consumption of the transmitter,
wherein the transmitter is configured to calculate, according to the parameters, the power consumption of the transmitter under various combinations of modulation orders and coding rates supported by the transmitter,
wherein the transmitter is configured to select a bitwidth, modulation order, and coding rate corresponding to minimum power consumption of the transmitter to code and modulate data sent to the receiver, wherein the receiver is configured to receive the data after coding and modulation from the transmitter, and wherein the receiver is further configured to send a minimum value of a baseband bitwidth of the receiver, a bitwidth supported by analog-to-digital conversion, and a bitwidth supported by digital-to-analog conversion as a supported bitwidth of the receiver to the radio resource management subunit.

18. A transmitter apparatus for coding and modulating data comprising:

a radio resource management unit; and a digital processing unit, wherein the radio resource management unit is configured to obtain, from a receiver and a transmitter, parameters for calculating power consumption of the transmitter, wherein the radio resource management unit is configured to calculate, according to the parameters, the power consumption of the transmitter under various combinations of modulation orders and coding rates supported by the transmitter, wherein the radio resource management unit is configured to select a bitwidth, modulation order, and coding rate corresponding to minimum power consumption of the transmitter, wherein the radio resource management unit is configured to control the digital processing unit to code and modulate, according to the bitwidth, the modulation order, and the coding rate corresponding to the minimum power consumption of the transmitter, data sent to the receiver, and wherein the digital processing unit is configured to code and modulate, according to the bitwidth, the modulation order, and the coding rate corresponding to the minimum power consumption of the transmitter, the data sent to the receiver.

19. The apparatus according to claim 18, wherein the radio resource management unit comprises:

a radio resource management subunit; and a bitwidth control subunit, wherein the radio resource management subunit is configured to:

determine, under various combinations of modulation orders and coding rates supported by the transmitter, an upper bitwidth threshold according to a supported bitwidth of the receiver;

obtain a quantized noise of the transmitter by calculation according to a supported minimum received signal-to-noise ratio fed back by the receiver, a detected channel quality, and a maximum transmit power supported by the transmitter;

use a bitwidth corresponding to the quantized noise as a lower bitwidth threshold;

select in a range between the upper bitwidth threshold and the lower bitwidth threshold a plurality of available bitwidths of the transmitter according to a bitwidth feature of the transmitter which is sent by the digital processing unit;

calculate power consumption of the transmitter under the plurality of available bitwidths of the transmitter according to a service demand and channel quality of the receiver;

select minimum power consumption of the transmitter in the power consumption of the transmitter under the plurality of available bitwidths of the transmitter; and send a bitwidth, modulation order, and coding rate corresponding to the selected minimum power consumption of the transmitter to the bitwidth control subunit, wherein the bitwidth control subunit is configured to control, according to the bitwidth, the modulation order, and the coding rate sent by the radio resource management subunit, the digital processing unit to make an adjustment to the bitwidth, the modulation order, and the coding rate, and wherein the digital processing unit is further configured to send the bitwidth feature of the transmitter to the radio resource management subunit.

20. The apparatus according to claim 19, wherein the radio resource management subunit is further configured to use a minimum value of a baseband bitwidth of the receiver, a bitwidth supported by analog-to-digital conversion, and a bitwidth supported by digital-to-analog conversion as a supported bitwidth of the receiver.

* * * * *

UNITED STATES PATENT AND TRADEMARK OFFICE
CERTIFICATE OF CORRECTION

PATENT NO. : 8,687,714 B2
APPLICATION NO. : 13/860760
DATED : April 1, 2014
INVENTOR(S) : Zhang et al.

It is certified that error appears in the above-identified patent and that said Letters Patent is hereby corrected as shown below:

In the Claims

Column 13 & 14, Lines 64 - 14, Claim 1 should read:

A method for coding and modulating data comprising:
obtaining, from a receiver and a transmitter, parameters for calculating power consumption of the transmitter;
calculating, according to the parameters, the power consumption of the transmitter under various combinations of modulation orders and coding rates supported by the transmitter; and
selecting a bitwidth, modulation order, and coding rate corresponding to minimum power consumption of the transmitter to code and modulate data sent to the receiver,
wherein the parameters comprise a supported bitwidth fed back by the receiver and a bitwidth feature of the transmitter, and
wherein the supported bitwidth of the receiver comprises a minimum value of a baseband bitwidth of the receiver, a bitwidth supported by analog-to-digital conversion, and a bitwidth supported by digital-to-analog conversion.

Signed and Sealed this
Fourteenth Day of October, 2014

Michelle K. Lee
*Deputy Director of the United States Patent and Trademark Office*